(12) United States Patent
Labbé

(10) Patent No.: US 11,396,113 B2
(45) Date of Patent: Jul. 26, 2022

(54) METHOD FOR MANUFACTURING CROSS-LINKABLE POLYETHYLENE COMPOUNDS

(71) Applicant: BUSS AG, Pratteln (CH)

(72) Inventor: Denis Labbé, Sergy (FR)

(73) Assignee: Buss AG, Pratteln (CH)

( * ) Notice: Subject to any disclaimer, the term of this patent is extended or adjusted under 35 U.S.C. 154(b) by 509 days.

(21) Appl. No.: 16/070,472

(22) PCT Filed: Jan. 11, 2017

(86) PCT No.: PCT/IB2017/050117
§ 371 (c)(1),
(2) Date: Jul. 16, 2018

(87) PCT Pub. No.: WO2017/122122
PCT Pub. Date: Jul. 20, 2017

(65) Prior Publication Data
US 2019/0070752 A1 Mar. 7, 2019

(30) Foreign Application Priority Data

Jan. 15, 2016 (EP) ..................................... 16151519

(51) Int. Cl.
*B29B 9/06* (2006.01)
*B29B 7/32* (2006.01)
(Continued)

(52) U.S. Cl.
CPC .............. *B29B 9/065* (2013.01); *B29B 7/325* (2013.01); *B29B 7/46* (2013.01); *B29B 7/748* (2013.01);
(Continued)

(58) Field of Classification Search
None
See application file for complete search history.

(56) References Cited

U.S. PATENT DOCUMENTS 3,740,383 A    6/1973   Gabellier et al.
5,375,961 A * 12/1994   Mojden .................. B65B 69/00
                                           414/412
(Continued)

FOREIGN PATENT DOCUMENTS

CN            1640938 A      7/2005
CN            1638944 A      5/2006
(Continued)

OTHER PUBLICATIONS

Search Report in corresponding Russian Application No. 2018129647/05(047840), dated Apr. 15, 2020.
(Continued)

*Primary Examiner* — Francisco W Tschen
*Assistant Examiner* — Adrianna N Konves
(74) *Attorney, Agent, or Firm* — Hershkovitz & Associates, PLLC; Abraham Hershkovitz; Eugene C. Rzucidlo

(57) ABSTRACT

Installation for manufacturing cross-linkable polyethylene compounds which comprises a melting machine (101), a melt pump (102) and a filtration unit (103). The installation allows to produce cross-linkable polyethylene compounds that may be further used for manufacturing insulating parts of medium, high and extra-high voltage power cables. A method for manufacturing cross-linkable polyethylene compounds is further provided.

6 Claims, 2 Drawing Sheets

(51) Int. Cl.

| | | |
|---|---|---|
| | *B29B 7/46* | (2006.01) |
| | *B29B 7/74* | (2006.01) |
| | *B29B 7/88* | (2006.01) |
| | *B29B 7/80* | (2006.01) |
| | B29B 9/16 | (2006.01) |
| | B29K 23/00 | (2006.01) |
| | B29K 105/24 | (2006.01) |

(52) U.S. Cl.
CPC .......... *B29B 7/7461* (2013.01); *B29B 7/7485* (2013.01); *B29B 7/80* (2013.01); *B29B 7/88* (2013.01); *B29B 9/16* (2013.01); *B29K 2023/0633* (2013.01); *B29K 2105/24* (2013.01)

(56) References Cited

U.S. PATENT DOCUMENTS

| | | | |
|---|---|---|---|
| 2003/0021991 A1* | 1/2003 | Sugayoshi | B01J 2/20 |
| | | | 428/372 |
| 2006/0108706 A1 | 5/2006 | Galimberti et al. | |
| 2007/0284771 A1 | 12/2007 | Boothe et al. | |
| 2008/0249199 A1 | 10/2008 | Nising | |
| 2009/0110833 A1 | 4/2009 | Wright et al. | |
| 2009/0203840 A1 | 8/2009 | Wayne et al. | |
| 2011/0116975 A1 | 5/2011 | Persinger et al. | |
| 2013/0115092 A1 | 5/2013 | Ozbaysal | |
| 2015/0001755 A1 | 1/2015 | Abe et al. | |
| 2015/0123303 A1 | 5/2015 | Turnow et al. | |
| 2016/0375616 A1 | 2/2016 | Yang et al. | |

FOREIGN PATENT DOCUMENTS

| | | |
|---|---|---|
| EP | 0 445 847 A2 | 9/1991 |
| EP | 0445847 A3 | 9/1991 |
| EP | 2 918 388 A1 | 9/2005 |
| GN | 101186084 A | 5/2008 |
| JP | 02503657 A | 11/1990 |
| JP | 1995021297 U | 4/1995 |
| JP | 2009534222 A | 9/2009 |
| JP | 2011502062 A | 1/2011 |
| JP | 2011527649 A | 11/2011 |
| JP | 2015503047 A | 1/2015 |
| JP | 2017511400 A | 4/2017 |
| RU | 2191439 C2 | 10/2002 |
| SU | 419041 A3 | 3/1974 |
| WO | 8808013 A1 | 10/1988 |
| WO | 99/21194 A1 | 4/1999 |

OTHER PUBLICATIONS

Decision on Grant in corresponding Russian Application No. 2018129647/05(047840), dated Apr. 20, 2020.
English language translation of Decision on Grant in corresponding Russian Application No. 2018129647/05(047840), dated Apr. 20, 2020.
Machine-generated English language translation of Description of SU 419041 A3 (Mar. 5, 1974).
English language Abstract of RU 2191439 C2 (Oct. 20, 2002).
International Search Report (ISR) dated Apr. 19, 2017 in International Application PCT/IB2017/050117.
Written Opinion of the International Search Authority (ISA) dated Apr. 18, 2017 (and attached European Register) in PCT/IB2017/050117.
Office Action (OA) dated Dec. 4, 2019 in corresponding Chinese Application 2017800065671 filed Jan. 11, 2017.
English Language Translation of Office Action (OA) dated Dec. 4, 2019 in corresponding Chinese Application 2017800065671 filed Jan. 11, 2017.
Office Action in related Chinese Application No. 2017800065671, dated Sep. 2, 2020.
English language translation of Office Action in related Chinese Application No. 2017800065671, dated Sep. 2, 2020.
Machine-generated English language translation of CN 1640938 A (Jul. 20, 2005).
Official Action dated Mar. 16, 2021 in corresponding Indian Application No. 201817029187.
Office Action in related Japanese Application No. 2018-537529, dated Feb. 3, 2021.
English language translation of Office Action in corresponding Japanese Application 2018-537529, dated Feb. 3, 2021.
Machine-generated English language translation of description and claims of JPU1995-021297 (Apr. 18, 1995).

* cited by examiner

METHOD FOR MANUFACTURING CROSS-LINKABLE POLYETHYLENE COMPOUNDS

TECHNICAL FIELD OF THE INVENTION

The invention concerns the technical field of installations for manufacturing polymer compounds. The invention is directed in particular to an installation for manufacturing cross-linkable polyethylene compounds and to a method for manufacturing cross-linkable polyethylene compounds.

STATE OF THE ART

Cross-linkable polyethylene (XLPE) is used for manufacturing insulation parts of power cables, in particular medium, high and extra-high voltage power cables. Because power cables are usually buried in the ground for several decades, insulation parts must show constant chemical and mechanical properties over long periods of time. One of those required properties, heat aging stabilization, is linked to persistence over time of optimum insulation and electrical properties and is of paramount importance.

The document US 2009110833 provide an example of installation for the manufacturing of cross-linkable polymer compounds. EP 2918388 provides another example of installation for recycling plastic materials.

In order to produce cross-linkable polyethylene that can allow such required properties to be provided, in particular to produce high-quality cross-linkable polyethylene that respects the technical and legal standards allowing it to be used for manufacturing insulation parts of medium, high or extra-high voltage power cables, it is necessary to conduct a process that mixes raw material, for example low-density polyethylene (LDPE), additives and peroxide.

Usually, this process is implemented by making use of a so-called Conventional Medium High—Extra High Voltage—Cross-linkable Polyethylene Compound Production Line which is a mature technology that started in the 60's. Such production lines always require a reasonably large plant where, in order to ensure the manufacturing environment required by the process that is fulfilled, a high-level of cleanliness must be maintained. This high level of cleanliness implies the use of so-called "clean rooms", in which technologies to avoid presence of contaminants are provided, and the provision of several technologies to constantly monitor and maintain the required high cleanliness level.

In terms of the process which is implemented, state of the art production lines or installations, when they are designed to produce cross-linkable polyethylene that respects the technical and legal standards allowing it to be used for manufacturing insulation parts of medium, high or extra-high voltage power cables, materialize the principle that, since the peroxide, which has to be incorporated at some stage of the process, is not able to stand the required compounding temperatures, it must be subsequently incorporated during a so-called soaking process.

This principle implies that traditional production plants, in particular those designed to produce cross-linkable polyethylene that respects the technical and legal standards allowing it to be used for manufacturing insulation parts of medium, high or extra-high voltage power cables, are always based on a batch peroxide soaking process, with controlled heating, cooling and residence time sequences. This soaking process is always conducted in an enclosed soaking tower which height is usually around 50 m, such high height being necessary because the chain of operations conducted inside the tower relies on gravity.

Therefore, state of the art installations for manufacturing high-quality cross-linkable polyethylene present a first disadvantage because, relying on a specific process, they must always have at least one very high soaking tower. However, depending on the area of the world, it is not always easy to obtain a construction permit for erecting such an elevated tower. Moreover, there are definitely some regions in the world where building a tower of a relatively high height is strictly forbidden.

In terms of costs, state-of-the-art installations for manufacturing high quality cross-linkable compounds present a second disadvantage because they are pretty expensive, with a price ranging between 15 to 20 million USD which includes the land, a complete compounding unit, the soaking unit and associated buildings. These figures are also inherent to the country where the global unit is erected. Obviously, such a big capital investment is largely impacted by the cost of erecting the soaking towers.

In addition to the need of a soaking tower and associated cost, traditional production lines present also other disadvantages such as a non-homogeneous dispersion of the peroxide, a high risk of external contamination, the need to have many clean rooms and associated dedicated people, the difficulty to maintain high-levels of cleanliness and further disadvantages in terms of energy consumption, which obviously leads to relatively large carbon footprint.

SUMMARY OF THE INVENTION

The present invention provides a new installation for manufacturing cross-linkable polyethylene compound without any drawbacks known in the art.

In particular, the present invention intends to provide an installation for manufacturing cross-linkable polyethylene, in particular cross-linkable polyethylene which quality fulfills the legal and technical requirements allowing it to be used for manufacturing insulation parts of medium, high or extra-high voltage power cables, which installation does not need any soaking tower.

The invention also provides an installation for manufacturing high quality cross-linkable polyethylene which is less expensive to build.

These goals are achieved by an installation for manufacturing a cross-linkable polyethylene compound, the installation defining a production path starting at an entry point where raw material is acquired, the installation comprising a first melting machine (101), a melt pump (102) and a filtration unit (103), and the installation further comprises, in a direction starting at the entry point and going along said production path, either a cooler (104) arranged after the filtration unit (103), a mixer (106) arranged after the cooler (104) and an additive dispensing unit (105) connected with the first melting machine (101), with the cooler (104), with the mixer (106) and/or with connection means that connect together the cooler (104) and the mixer (106), or a second melting machine (111) arranged after the filtration unit (103) and an additive dispensing unit (105) connected to the second melting machine (111), or a post extrusion additive dispensing unit (112) arranged after the filtration unit (103) and an additive dispensing unit (105) connected to the post extrusion additive dispensing unit (112), and a method for manufacturing a cross-linkable polyethylene compound, comprising:

using a first melting machine (101), which output is connected to a melt pump's (102) input;

using a filtration unit (103), which input is connected to the melt pump's (102) output; wherein the method further comprises:

using either a cooler (104), which input is connected to the filtration unit's (103) output, a mixer (106), which input is connected to the cooler's (104) output, and an additive dispensing unit (105), which output is connected with the melting machine (101), with the cooler (104), with the mixer (106) and/or with connection means that connect together the cooler and the mixer; or using a second melting machine (111), which input is either connected to the filtration unit (103) or to drying unit (109), which input is connected to an output of an underwater pelletizing unit, which input is connected to an output of the filtration unit (103).

By making use of specific components arranged in a specific order, the installation according to the invention, in particular when it must be used for manufacturing cross-linkable polyethylene which quality fulfills the legal and technical requirements allowing it to be used for manufacturing insulation parts of medium, high or extra-high voltage power cables, does not need any soaking tower. Indeed, the presence of specific components arranged in a specific order allows to decrease the polymer compound temperature from a high level of temperature that has to be set on the melting machine, so as to allow the very fine filtration level required for the production of cross-linkable polyethylene that can be used for manufacturing insulation parts of medium, high and extra-high voltage power cables, to a lower level which allows peroxide to be incorporated into the compound without initiating the decomposition reaction.

Further advantages are provided by specific embodiments as described in detail hereinbelow.

DESCRIPTION OF THE FIGURES

Objects and advantages of the invention will be realized by the person skilled in the art by reading the following detailed description of several embodiments which should be taken in conjunction with the drawings wherein.

DETAILED DESCRIPTION OF THE INVENTION

As may be seen on the figures, the installation 100 for manufacturing cross-linkable polyethylene compound according to the invention defines a production path that starts at an entry point of the installation, where raw material is acquired. Depending on the end product to be output by the installation, the raw material may be low-density polyethylene (LDPE), very low-density polyethylene (VLDPE), Ethylene Propylene Rubber (EPR), ethylene-vinyl acetate (EVA), ethylene propylene diene monomer (EPDM M-class) rubber or other copolymers (EVA, EEA, EMA, EBA) or any of the above-mentioned polymers and co-polymers pre-stabilized with one or more antioxidants or a composition thereof. Each of the above-mentioned polymers and co-polymers may be neat. They may be used alone or in combination with other polymers or co-polymers. The raw material may be produced at the same location of the installation, delivered to the installation through a pipe connected to a reactor area, via one or more intermediate buffers or silos, or it may be delivered through palettes of, usually, 25 kg bags. Usually, raw material is preferably delivered to the installation in the form of pellets or even under powder form.

Along the production path, the installation 100 according to the invention comprises several components arranged in a specific order. All components along the production path are connected together by connection means such as pipes, tubes or any other equivalent connection means well known in the art of polymer compound production plants.

Figure 1:
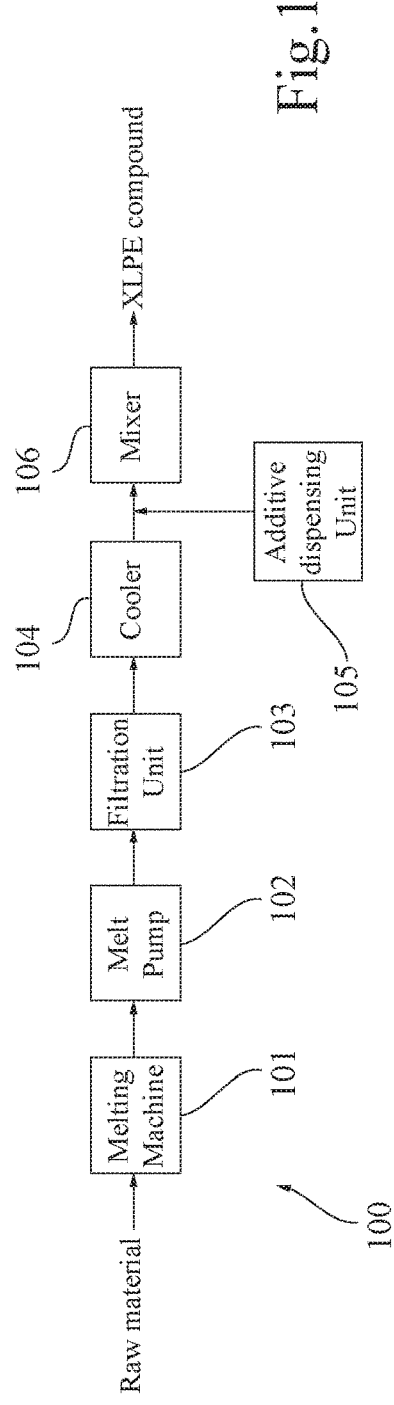
FIG. 1 diagrammatically shows an installation according to a first embodiment of the invention.

According to a first embodiment of the invention, shown on FIG. 1, the installation comprises a melting machine 101 which acquires, melts and mixes raw material. The melting machine 101 allows preparing polymeric formulations by heating, mixing and/or blending polymers and additives in a molten state. These polymers and additives are automatically dosed with fixed set points usually through feeders also called loss-in-weight feeders or volumetric feeder or even side feeders. The melting machine 101 is meant to output a homogeneous molten compound in which distribution and dispersion of additives, if present, as well as shear rate and temperature of the molten compound are optimal.

The melting machine 101 is made to heat the polymer compound at a preset temperature and is equipped with several inlets to allow mixing of different polymers or adding additives, for example antioxidant or conductive carbon black, to the polymer compound whenever a special formulation is required. For example, water tree resistant compounds or DC (Direct Current) compounds or semiconductor compounds might require adding several polymers and/or solid or liquid ingredients. Should additives, with a concentration between zero and 50%, be added to the formulation, no nitrogen blanket is required.

The melting machine 101 may be an internal mixer, a twin-screw co-rotating extruder, a twin-screw counter-rotating extruder, a continuous mixer, a co-kneader or any other type of melting machine known in the art of polymer compound production.

Optionally, a debagging unit (not shown), which role is to open and discharge bags of raw material to feed the melting machine 101, is arranged before the melting machine 101.

Once the compound has gone through the melting machine 101, it is pumped by a melt pump 102 and pressed through a filtration unit 103. The melting temperature set on the melting machine 101, when the desired product provided by the installation is cross-linkable polyethylene which quality fulfills the legal and technical requirements allowing it to be used for manufacturing insulation parts of medium, high or extra-high voltage power cables, depends on the filtration level, but is generally around 200° C. This is well above the temperature of the decomposition of the peroxides. As the skilled person knows, such high temperature forbids to incorporate peroxide at this stage of the process and, therefore, peroxide has to be incorporated farther on during the process as will be described below.

The input of the melt pump 102 is connected directly to the output of the melting machine 101. The melt pump builds pressure and provides a consistent volume of output to the filtration unit 103. The gears of the melt pump 102 are filled by the melting machine 101 from the suction side and the melt pump 102 discharge a constant volume of melt to the filtration unit 103. This process is continuous.

The filtration unit 103 filters the compound coming out the melt pump 102. Preferably, the filtration unit's input is connected directly to the melt pump's output.

Preferably, the filtration unit 103 ensures filtration at 35 mesh to 500 mesh, which ensures filtration of sizes between 25 μm to 500 μm. The filtration unit 103 may provide a larger range of filtration depending on the requested quality of the insulating product, related either to medium voltage or extra high voltage. Thus, the filtration range can span from about 10 microns up to about 500 microns.

Preferably, the filtration unit 103 includes a screen changer technology, such as continuous plate, rotating screen changer, slide plate screen changer or any candle filter with woven or none woven filter medium able to stop particles which size ranges from 10 μm to 500 μm, preferably 25 μm to 500 μm, as well as high polyethylene molecular weights known as Gels.

In contrast to prior art installations, once the compound has gone through the filtration unit 103, it enters a cooler 104. The role of the cooler 104 is to decrease the temperature of the compound to a level which allows peroxide to be incorporated into the compound without initiating the peroxide scission reaction. The cooler 104 is merely one of several melt coolers well known in the art. The cooler's principle is such that the melt flows in a single stream through a dense arrangement of pins or tooth meanwhile a cooling media flows inside the pins or the tooth as well as the mantel jacket. This induces a high heat exchange area which allows effective cooling over a relatively short length.

Further, the cooler 104 is connected to a mixer 106. Preferably, the cooler's 104 output is directly connected to the mixer's 106 input. Alternatively, the cooler's output is connected to the mixer's input via additional connection means such as pipes or tubes. The mixer 106, either a static mixer or a melt blender or any machine described above, comprises four to six mixing elements which role is to homogenize the polymer melt in a radial direction. This ensures a high mixing degree of the melt which leads to high quality end products.

The mixer 106 does not have any moving parts, i.e. it is a motionless or static mixer. It allows low energy consumption, it is free of maintenance and does not induce any risk in terms of leakage. It further allows predictable homogenisation of the polymer compound, it is relatively cheap and thus provide a faster return on investment.

The installation 100 further comprises an additive dispensing unit 105 which is connected to the cooler 104, to the mixer 106 and/or to connection means, such as pipes or tubes, which connect together the cooler 104 and the mixer 106. Alternatively, when XLPE for medium voltage cables has to be produced, the additive dispensing unit 105 may be connected directly to the melting machine 101 or the use of feeders described in [0020] (not shown).

The role of the additive dispensing unit 105 is to allow incorporating peroxide and/or antioxidants and any liquid/molten solid used in water tree retardant formulations or DC formulations or semiconductive formulations into the polymer compound in liquid form. Peroxide may be added as a premix of peroxides. Antioxidants may be added as an antioxidant package, which may be prepared in advance. Once the melt coming out the filtration unit 103 has been cooled down by the cooler 104 to peroxide compatible temperatures, around 120° C., both, antioxidant and peroxide, preferably under liquid form, may be injected down to the melt, for example via a metering pump. A temperature comprised between around 105° C. and around 140° C. is acceptable with regard to the peroxide decomposition, and is thus compatible with the present process. In case pre-stabilized polymer is used or free antioxidant has been added, whether in solid or liquid form, directly in the melting machine 101 there is no need to add additional antioxidant at that stage. In such a case, a nitrogen blanket is not necessary either.

Figure 2:
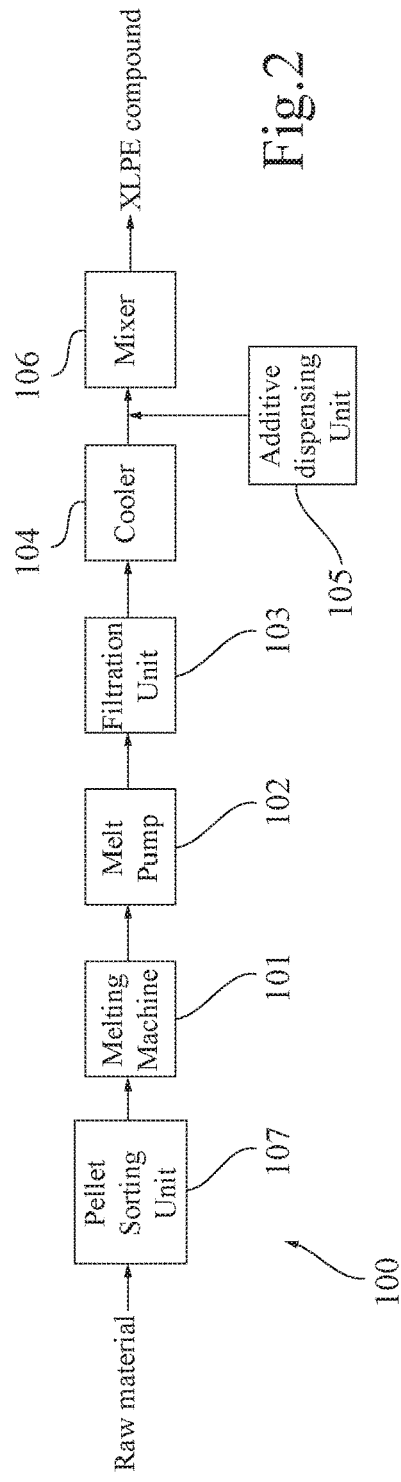
FIG. 2 diagrammatically shows an installation according to a second embodiment of the invention.

An installation according to a second embodiment of the invention is shown on FIG. 2.

The installation shares similar components with the installation according to the first embodiment but it further comprises a pellet sorting unit 107 arranged before the melting machine 101. Alternatively or cumulatively, an additional pellet sorting unit (not shown) may be arranged also down the production line, at some stage after the mixer 106, preferably just right before a final product, for example XLPE pellets, is conveyed to a packaging unit which packages the final product.

In this embodiment, raw material is thus first acquired by the pellet sorting unit 107 which role is to clean the raw material used by the installation. The pellet sorting unit 107 may be set such that any pellet containing a contaminant bigger than 60 μm is discarded before being introduced in the melting machine 101. To reach this goal, the pellet sorting unit 107 includes, in order to detect pellets which contain contaminants, one or more CCD cameras, one or more video cameras, X-ray, Ultraviolet or Infra-red detecting means and, in order to cast away unwanted pellets, a series of air nozzles.

Figure 3:
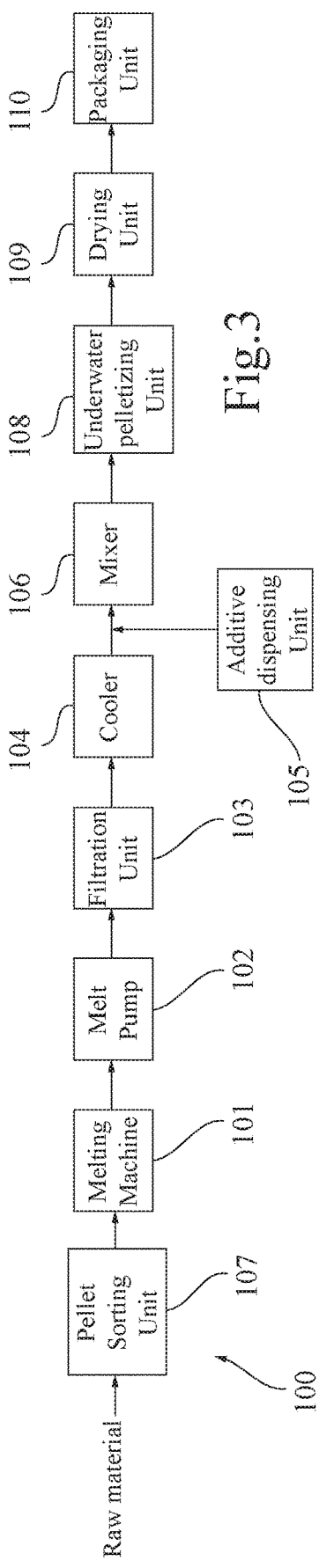
FIG. 3 diagrammatically shows an installation according to a third embodiment of the invention.

According to a third embodiment of the invention, shown on FIG. 3, the installation shares similar components with the installation according to the second embodiment but it further comprises an underwater pelletizing unit 108, a drying unit 109 and a packaging unit 110.

The underwater pelletizing unit 108 is fed by the molten compound coming from the mixer 106 and forced through a die plate. As the compound emerges from the die plate, pellets are cut in a cutting chamber by rotating blades and are solidified under water which flows across the die face inside the cutting chamber.

Pellets are then transported to a drying unit 109, for example a centrifugal dryer, where residual water is removed so as to output dry pellets.

Further, the packaging unit 110 is adapted to package the product, i.e. the pellets coming out the drying unit 109, for example in van boxes or octabins. In order to prevent dust to enter in the packaging unit, the octabins may be assembled outside the packaging unit 110. The octabins enter the packaging unit 110 through air locks and pellets are discharged in the octabins. Boxes are further bar coded, identified, given a blend number and conveyed toward an automatic wrapping station prior to be warehoused.

Figure 4:
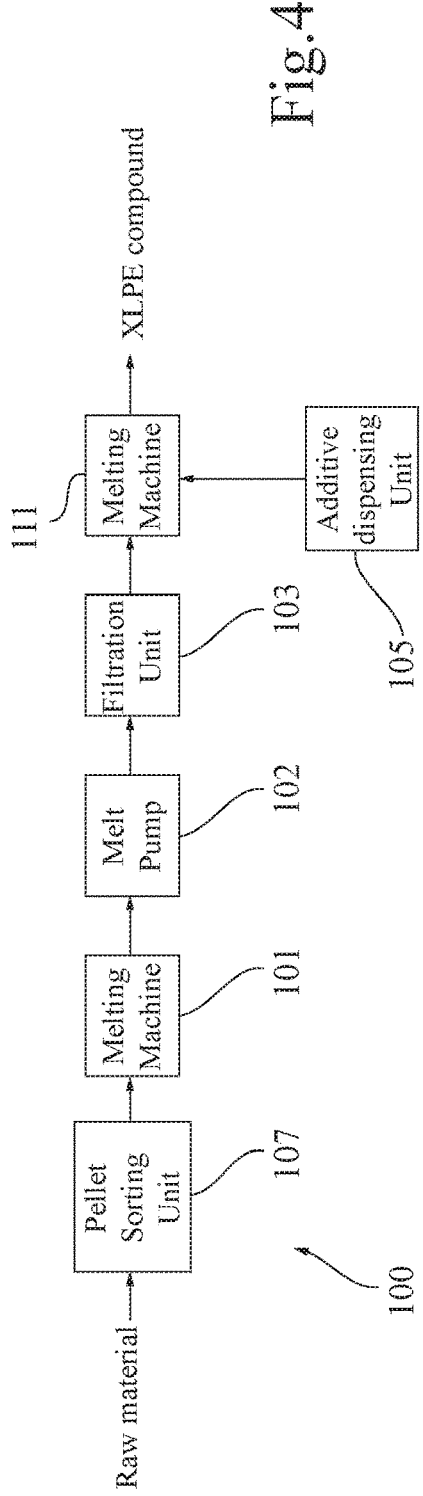
FIG. 4 diagrammatically shows an installation according to a fourth embodiment of the invention.

An installation according to a fourth embodiment of the invention is shown on FIG. 4.

The installation according to the fourth embodiment shares similar components with the installation according to the first embodiment but the cooler 104 and the mixer 106 are substituted by a second melting machine 111. The second melting machine 111 is equivalent to the first melting machine 101 but, instead of working at a temperature level around 190° C., it works with a temperature gradient from 190° C., close to its input, to 130° C., close to its output. The compound coming out the filtration unit 103 is directly fed into the second melting machine 111.

Further, the installation includes an additive dispensing unit 105 which is connected to the second melting machine 111, preferably close to the end of it. Since the melting machine is rather long, the temperature of the compound decreases over the length of the second melting machine 111 which allows peroxide to be incorporated.

Preferably, a pellet sorting unit 107 is moreover arranged before the first melting machine 101. Alternatively, the installation according to the fourth embodiment of the invention does not include any pellet sorting unit.

Figure 5:
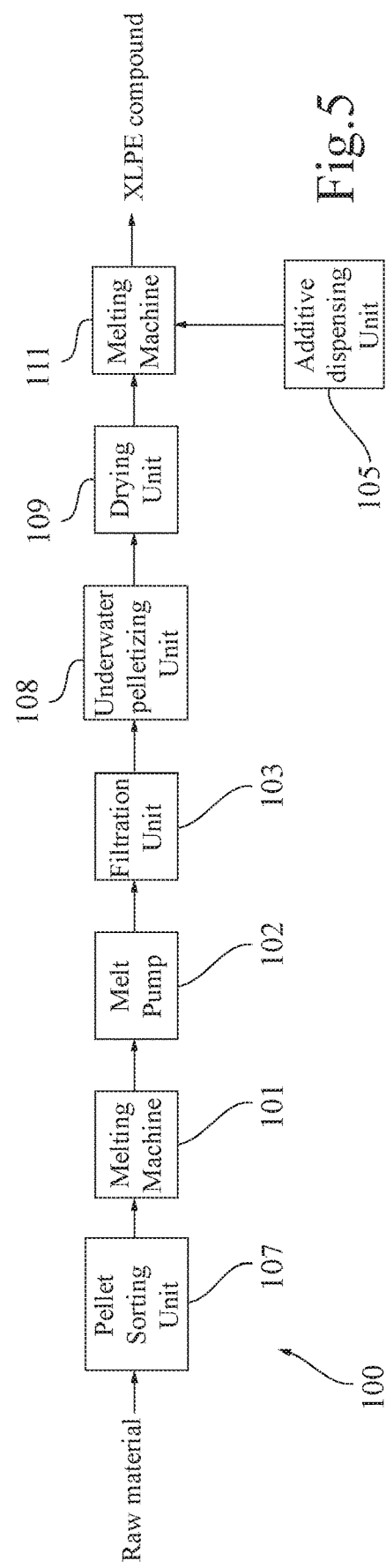
FIG. 5 diagrammatically shows an installation according to a fifth embodiment of the invention.

According to a fifth embodiment, shown on FIG. 5, the installation shares similar components with the installation according to the fourth embodiment but an underwater pelletizing unit 108 is arranged right after the filtration unit 103. The underwater pelletizing unit's output is further connected to a drying unit 109 and a second melting machine 111 is arranged right after the drying unit 109.

In all embodiments of the present invention, the first melting machine 101, the melt pump 102, the filtration unit 103, and the pellet soring unit 107, may be arranged in a different order. Alternatively or in addition, anyone of the pellet sorting unit 107, first melting machine 101, melt pump 102 and filtration unit 103 may be omitted. This can be the case in particular for the melt pump 102. Alternatively or in addition, two of the pellet sorting unit 107, first melting machine 101, melt pump 102 and filtration unit 103 may be combined. In all the embodiments, the first melting machine 101 may be replaced by an extruder.

The installation and the method of the present invention are applicable to the manufacturing of insulating material comprising semiconductor additives or not.

All embodiments of the invention allow to produce high quality cross-linkable polyethylene, in particular cross-linkable polyethylene which quality fulfills the legal and technical requirements allowing it to be used for manufacturing insulation parts of medium, high or extra-high voltage power cables without the use of any soaking tower.

Example 1

The peroxide/antioxydant dispersion was evaluated for a cross-linkable polyethylene manufactured according to the method of the present invention, and compared to the peroxide dispersion for cross-linkable polyethylene samples commercially available, as follows:
A Low Density Polyethylene (LDPE) was produced according to the arrangement of FIG. 1. The antioxidant and the peroxide were premixed before injection, and added through the additive dispensing unit 105 under liquid form. The temperature of the melted LDPE compound was comprised between 115° C. and 120° C.
50 to 100 of the obtained pellets are collected, press molded into a film at 115° C. in a dedicated frame of 500 μm thick, and quickly cooled down.
The population of analyzed pellets was scanned with a Fourier Transform Infrared Spectrophotometer (FTIR). The additive net absorbance was determined for the two wavelengths 550 $cm^{-1}$ and 580 $cm^{-1}$. The film thickness was determined for each scan by measuring the net absorbance of the polyethylene band at 2019 $cm^{-1}$. The additive absorbance was determined using the following equation:

$$Y=\text{net ABS}((550\ cm^{-1}+580\ cm^{-1})/2)/\text{Net ABS}(2019\ cm^{-1})$$

The following parameters are considered:
n: the sample size or population
X: the point estimate, e.g., the sample mean
the level of confidence (most commonly 95%)
The chosen confidence, in turns, provides a confidence level coefficient to be fetch according to the Student Table.
"Stdv": the sampling variability or the standard error of the point estimate.
The following expression, provides the 95% confidence interval for the population mean and can be expressed as:

$$X\pm(\text{Stdv}*\text{Student}(95\%,n-1)(/sqr(n)$$

The results related to the sample no 1, produced according to the present invention, the sample no 2, corresponding to a first commercial compound produced with a conventional soaking system, and the sample no 3, corresponding to a second commercial compound produced with a conventional soaking system, are summarized in table 1 below:

TABLE 1

| Sample N° | Sample Size n | Standard Error Stdv | Stdv % against the mean | Student coefficient @ 95%, n−1 | 95% confidence interval for the population mean± | % deviation against the mean. (X2) |
|---|---|---|---|---|---|---|
| 1 | 100 | 1.95 | 4.59 | 1.984 | 0.380 | 1.8 |
| 2 | 50 | 10.50 | 16.72 | 2.009 | 3.016 | 9.6 |
| 3 | 50 | 4.37 | 6.75 | 2.009 | 1.255 | 4.0 |

The additive distribution is thus much narrow in the compound produced according to the present invention, compared to a traditional soaking process.

The invention claimed is:

1. A method for manufacturing an insulating part of a medium, high or extra-high voltage power cable using a cross-linkable polyethylene compound, wherein the cross-linkable polyethylene compound is manufactured by a continuous method comprising:
using a first melting machine (101) to melt a polyethylene compound to output a melted polyethylene compound, which output is connected to a melt pump's (102) input;
using a filtration unit (103), which input is connected to the melt pump's (102) output which discharges a constant volume of the melted polyethylene compound to the filtration unit (103);
and said method further comprises:
using a cooler (104) which input is connected to the filtration unit's (103) output, wherein the temperature of the melted polyethylene compound is decreased in the cooler (104) to to a level which allows a peroxide to be incorporated into the melted polyethylene compound without initiating the peroxide scission reaction, a mixer (106) which input is connected to the cooler's (104) output, and an additive dispensing unit (105) which output is connected with at least one of the cooler (104), the mixer (106), and a connector that connects the cooler and the mixer, wherein peroxide is incorporated into the melted polyethylene compound in liquid form via the additive dispensing unit (105).

2. The method of claim 1, wherein no soaking tower is used in the method.

3. The method of claim 1, wherein the compound is low-density polyethylene, very low-density polyethylene, ethylene propylene rubber, ethylene-vinyl acetate, ethylene propylene diene monomer rubber, or any of the above-mentioned polymers and co-polymers pre-stabilized with one or more antioxidants or a composition thereof.

4. The method of claim 2, wherein the compound is low-density polyethylene, very low-density polyethylene, ethylene propylene rubber, ethylene-vinyl acetate, ethylene propylene diene monomer rubber, or any of the above-mentioned polymers and co-polymers pre-stabilized with one or more antioxidants or a composition thereof.

5. The method of claim 1, wherein the mixer is a static mixer.

6. The method of claim 2, wherein the mixer is a static mixer.

\* \* \* \* \*